United States Patent
Hanes

(10) Patent No.: US 10,848,866 B2
(45) Date of Patent: Nov. 24, 2020

(54) AUDIO INTERFACE FOR MULTIPLE MICROPHONES AND SPEAKER SYSTEMS TO INTERFACE WITH A HOST

(71) Applicant: HEWLETT-PACKARD DEVELOPMENT COMPANY, L.P., Houston, TX (US)

(72) Inventor: David H. Hanes, Fort Collins, CO (US)

(73) Assignee: Hewett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/091,547

(22) PCT Filed: Apr. 5, 2016

(86) PCT No.: PCT/US2016/026058
§ 371 (c)(1),
(2) Date: Oct. 5, 2018

(87) PCT Pub. No.: WO2017/176259
PCT Pub. Date: Oct. 12, 2017

(65) Prior Publication Data
US 2019/0124442 A1   Apr. 25, 2019

(51) Int. Cl.
*H04R 3/00* (2006.01)
*G06F 3/16* (2006.01)
(Continued)

(52) U.S. Cl.
CPC .......... *H04R 3/005* (2013.01); *G06F 3/165* (2013.01); *G06F 3/167* (2013.01); *H04R 1/406* (2013.01);
(Continued)

(58) Field of Classification Search
CPC .... H04R 3/005; H04R 1/406; H04R 2420/07; H04R 5/02; G06F 3/167; G06F 3/165; G10L 2015/223
(Continued)

(56) References Cited

U.S. PATENT DOCUMENTS 7,280,133 B2 * 10/2007 Lord .................. H04N 7/17318
                                                       348/14.01
8,174,547 B2   5/2012 Yoneda et al.
(Continued)

OTHER PUBLICATIONS

Microsoft Windows XP Professional Operating System, "Managing Devices", https://technet.microsoft.com/en-us/library/bb457107.aspx#EGAA, Nov. 3, 2005 29 pages.

*Primary Examiner* — Paul Kim
(74) *Attorney, Agent, or Firm* — Fabian VanCott

(57) ABSTRACT

A non-transitory computer-readable medium includes instructions that, when executed by a processor, provide an audio interface to: communicate with an operating system of a host computer as a single audio device; accept audio input from multiple microphones; and provide an option to provide audio output to multiple speaker systems. A method includes: interacting with an operating system of a host computer using an audio interface, the audio interface appearing to the operating system as a single audio device; accepting audio input with the audio interface from multiple microphones; and providing an option to provide audio output with the audio interface to multiple speaker systems.

20 Claims, 9 Drawing Sheets

(51) Int. Cl.
*H04R 5/02* (2006.01)
*H04R 1/40* (2006.01)
*G10L 15/22* (2006.01)

(52) U.S. Cl.
CPC .......... *H04R 5/02* (2013.01); *G10L 2015/223* (2013.01); *H04R 2420/07* (2013.01)

(58) Field of Classification Search
USPC .......................................................... 381/92
See application file for complete search history.

(56) References Cited

U.S. PATENT DOCUMENTS

| | | |
|---|---|---|
| 8,494,181 B2 | 7/2013 | Nakao |
| 2003/0235407 A1 | 12/2003 | Lord |
| 2007/0124571 A1 | 5/2007 | Alperin et al. |
| 2013/0283164 A1 | 10/2013 | Mahalingam |
| 2014/0119558 A1 | 5/2014 | Goldstein |
| 2015/0086034 A1 | 3/2015 | Lombardi et al. |
| 2015/0279387 A1* | 10/2015 | List ................. G10L 15/08 704/226 |
| 2015/0288735 A1 | 10/2015 | Krishnamoorthy et al. |
| 2016/0004499 A1 | 1/2016 | Kim et al. |

* cited by examiner

AUDIO INTERFACE FOR MULTIPLE MICROPHONES AND SPEAKER SYSTEMS TO INTERFACE WITH A HOST

BACKGROUND

Portable wireless speakers allow a user to connect wirelessly to a source of audio data, such as a computer. The user can then take the speaker unit to other rooms within a home or office, for example, while streaming music from the stationary store of audio data.

BRIEF DESCRIPTION OF THE DRAWINGS

The accompanying drawings illustrate various implementations of the principles described herein and are a part of the specification. The illustrated implementations are merely examples and do not limit the scope of the claims.

Throughout the drawings, identical reference numbers designate similar, but not necessarily identical, elements.

DETAILED DESCRIPTION

Figure 1:
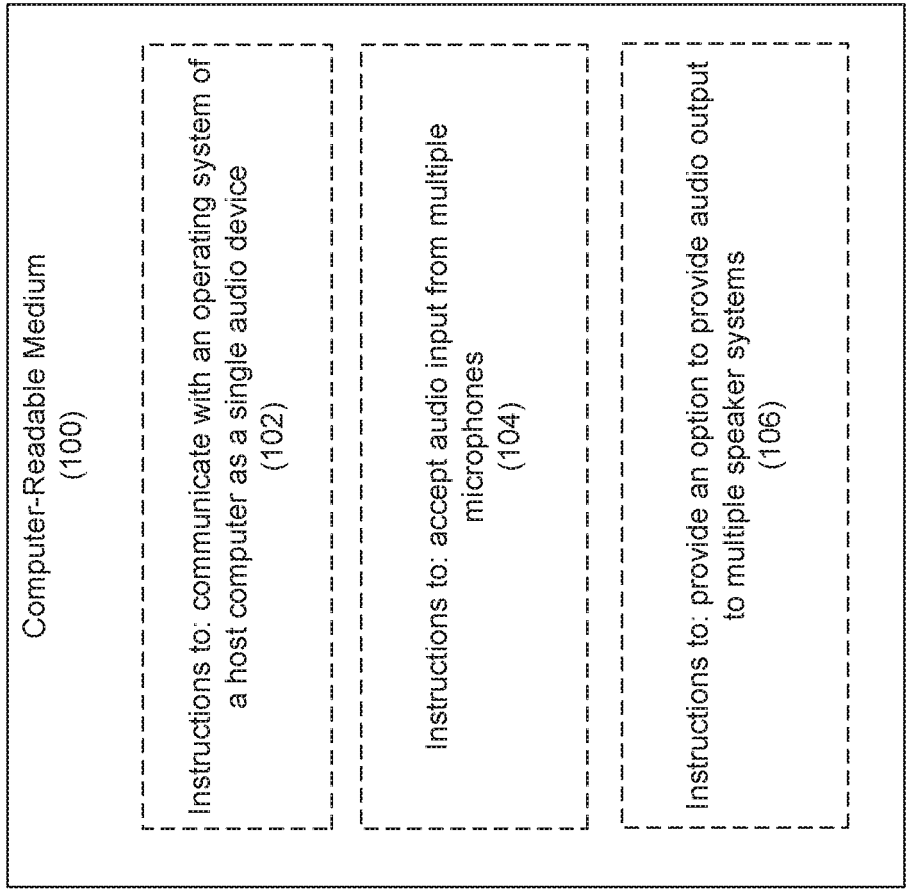
FIG. 1 is an illustration of an example computer-readable medium bearing instructions for execution by a processor consistent with the disclosed implementations.

As noted above, portable wireless speakers allow a user to connect wirelessly to a source of audio data, such as a computer. The user can then take the speaker unit to other rooms within a home or office, for example, while streaming music from the stationary store of audio data.

The host computer with which the portable wireless speaker is communicating may have its own microphone or speaker system incorporated therein. However, the operating system of the host computer may be configured to only operate, for example, one speaker system or one microphone. Consequently, if a portable wireless speaker is interfaced with the computer, this may preclude the operating system from also making any use of the speakers incorporated in the computer itself. Similarly, if a microphone is interfaced, wired or wirelessly, with the host computer, the host computer may then ignore or not operate its own internal microphone.

On another related subject, the Internet provides a tremendous wealth of information that can be searched and browsed using internet search engines. Additionally, users may keep significant personal information online such as a personal or business calendar, list of contacts and social connections, etc. With such information being stored on the Internet, it can be accessed by the user from a variety of devices, such as a personal computer or a smart phone.

To help manage all of this information and functionality, various personal assistant applications are becoming popular. Examples of such personal assistant applications include Sire from Apple, Inc, OK Google® from Google. Inc. and Cortana® from Microsoft Corporation.

A feature of these personal assistant applications is the ability of the user to give voice commands. The personal assistant application will process the audio of the spoken command with speech recognition and take action accordingly.

For example, the user may ask a question using natural language. The question may cause the personal assistant application to execute an Internet search for the answer. Alternatively, the question might be about the user's schedule, causing the personal assistant application to retrieve an answer from the user's electronic calendar.

Frequently, the personal assistant application will provide a verbal response to the user's vocal input. For example, the personal assistant application may verbally state the answer to the question the user has asked.

Because of the convenience of such verbal interfacing, personal assistant applications are particularly popular on mobile devices, such as smart phones, where a full size keyboard, monitor and other such user input devices are not available. However, personal assistant applications are also widely used on larger computers, such as laptop and desktop computers, which are stationary or less portable than a smart phone.

As noted above, portable wireless speaker units allow a user to connect wirelessly to a source of audio data, such as a computer. The user can then take the speaker unit to other rooms within a home or office, for example, while streaming music from the stationary store of audio data. This wireless speaker unit could be modified to include a microphone so as to allow a user to remotely access a personal assistant application, for example, that is running on a host computer with which the portable transceiver unit is in wireless communication. This computer may be, for example, a laptop, a larger personal computer or even a server that is generally stationary. If the user wants to access the personal assistant application on that computer from a remote location, the user can now do so with the portable transceiver unit described here.

This portable transceiver unit includes one or more microphones into which the user can issue a voice command. The portable transceiver unit then transmits the voice command to its host computer and the personal assistant application executing thereon. The personal assistant application then processes the voice command and transmits a response to the portable transceiver unit.

The portable transceiver unit may incorporate a speaker or system of speakers. The portable transceiver unit may use its speaker to output a verbal response from the personal assistant application. Additionally, the portable transceiver unit with speakers may also serve as a portable speaker unit with which a user can wirelessly stream audio from the host computer supporting the portable unit. As noted, the functionality of the portable transceiver unit described here could be added to a unit previously purposed only as a portable speaker unit.

Again, however, as noted above, the operating system of a host computer may be designed to interface with only one of each type of audio device at a time. Consequently, if external speakers are connected, physically or wirelessly, to the host computer, the host computer may output audio only to those speakers and not to the internal speakers incorporated into the computer itself. Similarly, if an external microphone is connected, physically or wirelessly, to the host computer, the host computer may then not accept any input from a microphone internally incorporated in the computer itself.

Consequently, if one user is operating a portable transceiver unit with speakers and or a microphone that are wirelessly connected to a host computer, this may cause the speakers or microphone of the host computer itself to be ignored and therefore inoperative during the time the portable transceiver unit is interfacing with the host computer. Thus, if there were multiple portable transceiver units available to the same or a number of different users, only one could be used to interface with the host computer a personal assistant application on the host computer at a time.

In such a case, it may be challenging to discontinue the operation of one such portable unit when a different such unit is to be operated. Similarly, if a user attempts to user the speaker or microphone at the host computer itself when the host is interfaced with a portable transceiver unit at another location, that user may be unable to get the speakers or microphone of the host computer to operate as desired.

Thus, in one example, the present specification describes a non-transitory computer-readable medium including instructions that, when executed by a processor, provide an audio interface to: communicate with an operating system of a host computer as a single audio device; accept audio input from multiple microphones; and provide an option to provide audio output to multiple speaker systems.

In another example, the present specification describes a method that includes: interacting with an operating system of a host computer using an audio interface, the audio interface appearing to the operating system as a single audio device; accepting audio input with the audio interface from multiple microphones; and providing an option to provide audio output with the audio interface to multiple speaker systems.

In another example, the present specification describes a host computer system including: a processor; a memory device to support operation of the processor; and an audio interface to: interface with an operating system of a host computer as a single audio device; accept audio input from multiple microphones; and provide an option to provide audio output to multiple speaker systems.

As used herein and in the following claims, the term "host computer" or "computer" will refer to a computer that is providing an audio signal to a speaker system and/or accepting audio input from a microphone. The host computer or computer could be any computerized device capable of supporting a speaker system or microphone including, but not limited to, a laptop computer, notebook computer, tablet computer, personal computer, desktop computer or server.

As used herein and in the following claims, the term "audio device" refers to any of the following: (1) a microphone, (2) a speaker or system of multiple coordinated speakers, or (3) a combination of a microphone and speaker system, such as a headset with both speakers and microphone. The operating system of a host computer may be designed to interface with only one of each type of audio device at a time. Consequently, if external speakers are connected to the host computer, the host computer may output audio only to those speakers and not to the internal speakers incorporated into the computer itself. Similarly, if an external microphone is connected to the host computer, the host computer may then not accept any input from a microphone internally incorporated in the computer itself.

As used herein and in the following claims, the term "portable transceiver unit" will refer to a portable unit for wirelessly interfacing and communicating with a separate host computer such that a user can operate the portable transceiver unit to both send and receive data to and from the host computer from a location removed from the actual location of the computer itself within range of the wireless communication between the portable transceiver unit and the host computer.

As used herein and in the following claims, the term audio interface will refer to an interface at a host computer that communicates with an operating system of a host computer as a single audio device; but can accept audio input from multiple microphones; and provide an option to provide audio output to multiple speaker systems. As described herein the audio interface can also identify a microphone and speaker system that correspond to each other, such as being incorporated together in the same portable transceiver unit, and can address audio output to a speaker system that corresponds to a microphone where the audio output is in response to an audio input from that microphone.

As used herein and in the following claims, the term "speaker system" refers to a number of speakers that are interfaced with a host computer as a unit. This term recognizes that a speaker system interfaced as the audio output for a host audio source may include only a single speaker or multiple speakers.

As a final note, use of the term "non-transitory" does not exclude from the scope of the claims any volatile memory devices, such as Random Access Memory (RAM). A memory device is not transitory merely because it is volatile.

In the following description, for purposes of explanation, specific details are set forth in order to provide a thorough understanding of the disclosure. It will be apparent, however, to one skilled in the art that examples consistent with the present disclosure may be practiced without these specific details. Reference in the specification to "an implementation," "an example" or similar language means that a particular feature, structure, or characteristic described in connection with the implementation or example is included in at least that one implementation, but not necessarily in other implementations. The various instances of the phrase "in one implementation" or similar phrases in various places in the specification are not necessarily all referring to the same implementation.

FIG. 1 is an illustration of an example computer-readable medium bearing instructions for execution by a processor consistent with the disclosed implementations. As shown in FIG. 1, a non-transitory computer-readable medium (100) includes instructions that, when executed by a processor, provide an audio interface to: communicate (102) with an operating system of a host computer as a single audio device; accept (104) audio input from multiple microphones; and provide (106) an option to provide audio output to multiple speaker systems.

As will be clear to those of skill in the art, during execution of the instructions, input from multiple microphones may or may not actually be received. However, the instructions provide an open channel so that multiple available microphones may provide audio input that is accepted. Similarly, if multiple speakers systems are available, the instructions may allow a user an option to determine to which of the multiple speaker systems an audio output will be delivered. This option may allow the user to select a single speaker system or multiple speaker systems to receive the audio output simultaneously.

The non-transitory computer-readable medium may be any device for storing the described instructions. For example, the computer readable-medium may be any form of computer memory that is incorporated in a host computer or portable between host computers.

Figure 2:
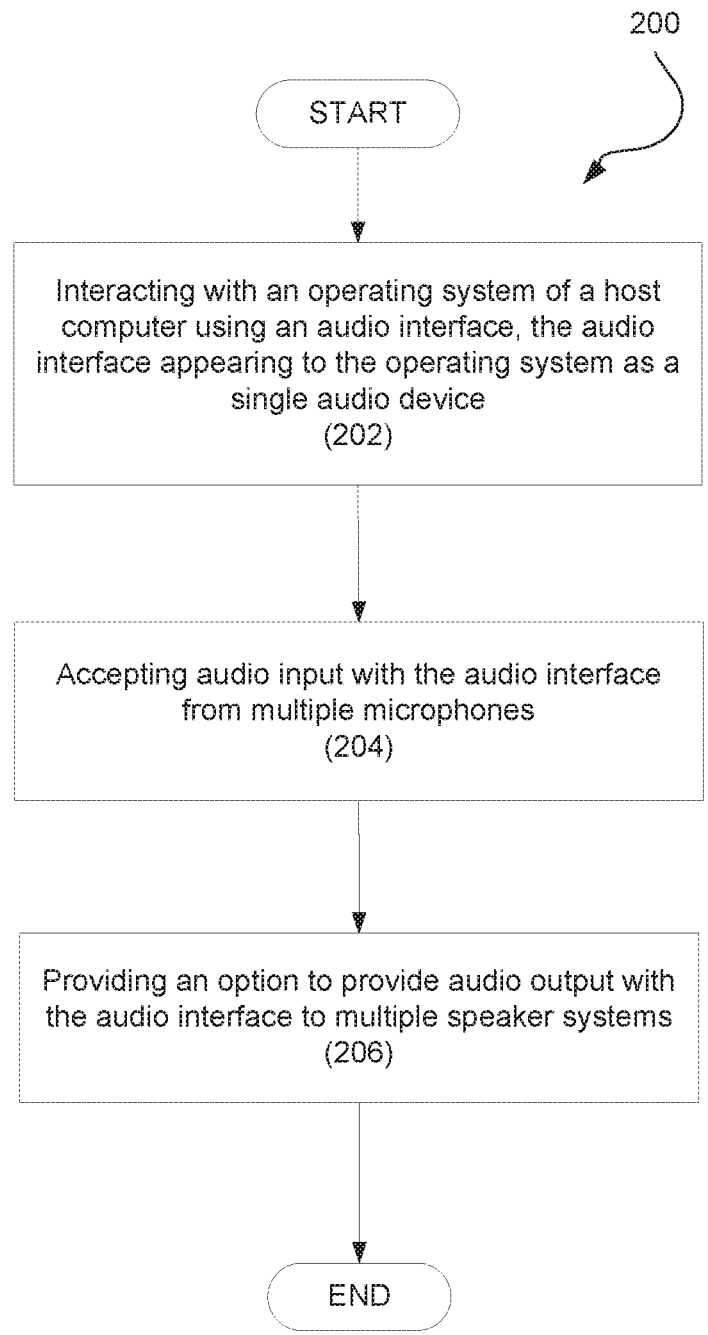
FIG. 2 is an example flowchart illustrating a method of interfacing multiple microphones or speaker systems with a host computer consistent with the disclosed implementations.

FIG. 2 is an example flowchart illustrating a method of interfacing multiple microphones or speaker systems with a host computer consistent with the disclosed implementations. As shown in FIG. 2, the method includes interacting (202) with an operating system of a host computer using an audio interface, the audio interface appearing to the operating system as a single audio device; accepting (204) audio input with the audio interface from multiple microphones; and providing (206) an option to provide audio output with the audio interface to multiple speaker systems.

Figure 3:
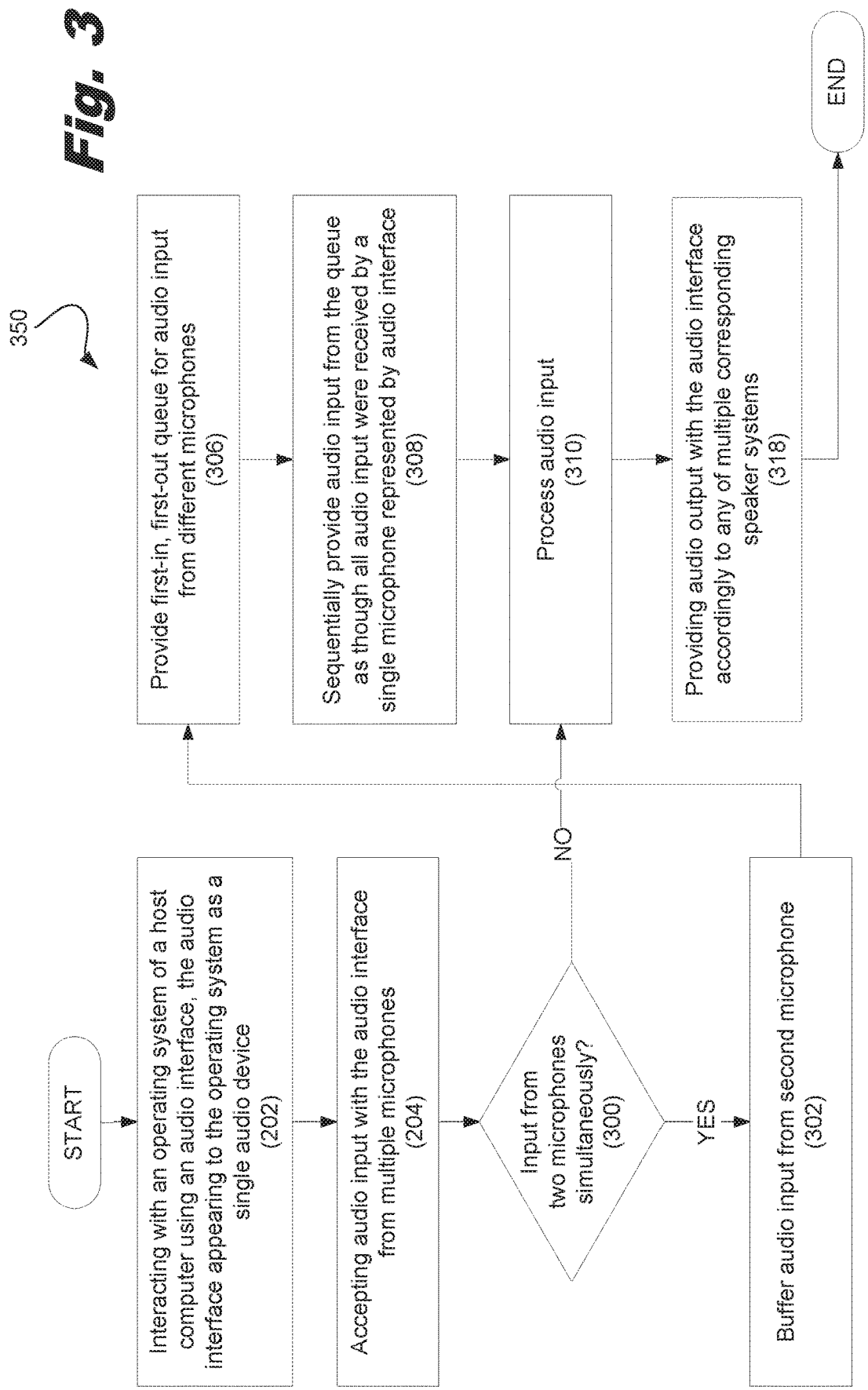
FIG. 3 is an example flowchart illustrating another method of interfacing multiple microphones or speaker systems with a host computer consistent with the disclosed implementations.

FIG. 3 is an example flowchart illustrating another method of interfacing multiple microphones or speaker systems with a host computer consistent with the disclosed implementations. As shown in FIG. 3, the method (350) includes interacting (202) with an operating system of a host computer using an audio interface, the audio interface appearing to the operating system as a single audio device. The method also includes accepting (204) audio input with the audio interface from multiple microphones.

With the audio interface accepting input from multiple microphones, input from a first microphone may be received and provided to the operating system of the host computer. Input from a second microphone may then be received and provided to the operating system of the host computer. To the operating system, this audio input appears to come from a single microphone because both inputs come through the audio interface.

It may be the case, however, that the audio interface receives audio input from two different microphones simultaneously. Thus, the method will determine (300) whether input from two microphones is received simultaneously. If not, each microphone input is processed (310) as received. If, however, two microphones input audio simultaneously, the method will buffer (302) the audio input from a second of the two microphones.

As will be appreciated, the audio interface could receive input simultaneously from more than two microphones. Again, in such a case, any input not immediately processed can be buffered.

This buffering may include, in some examples, providing (306) a first-in, first-out queue for audio input from all the microphones submitting audio input to the audio interface. In such an example, the audio interface sequentially provides (308) audio input from the queue to the host computer operating system in the order it was received. All the audio input is submitted to the host as though all audio input were received by a single microphone that is represented by audio interface.

The audio interface may monitor an audio input for a lull or silence. Upon detecting any such lull or silence in the audio input, the audio interface may be triggered to release the next-received, buffered audio input to the operating system of the host computer.

The host computer will process (310) the audio input coming from the queue. In all cases, the host computer may return an audio output that is in response to a specific audio input. When this occurs, the method may include having the audio interface determine a speaker system that corresponds to the microphone that provided the audio input to which the host is now responding. For example, the microphone in question may be associated with a particular speaker system because both are incorporated in the same portable transceiver unit. Accordingly, the audio interface provides (318) the audio output to the speaker system corresponding the microphone in question.

Figure 4:
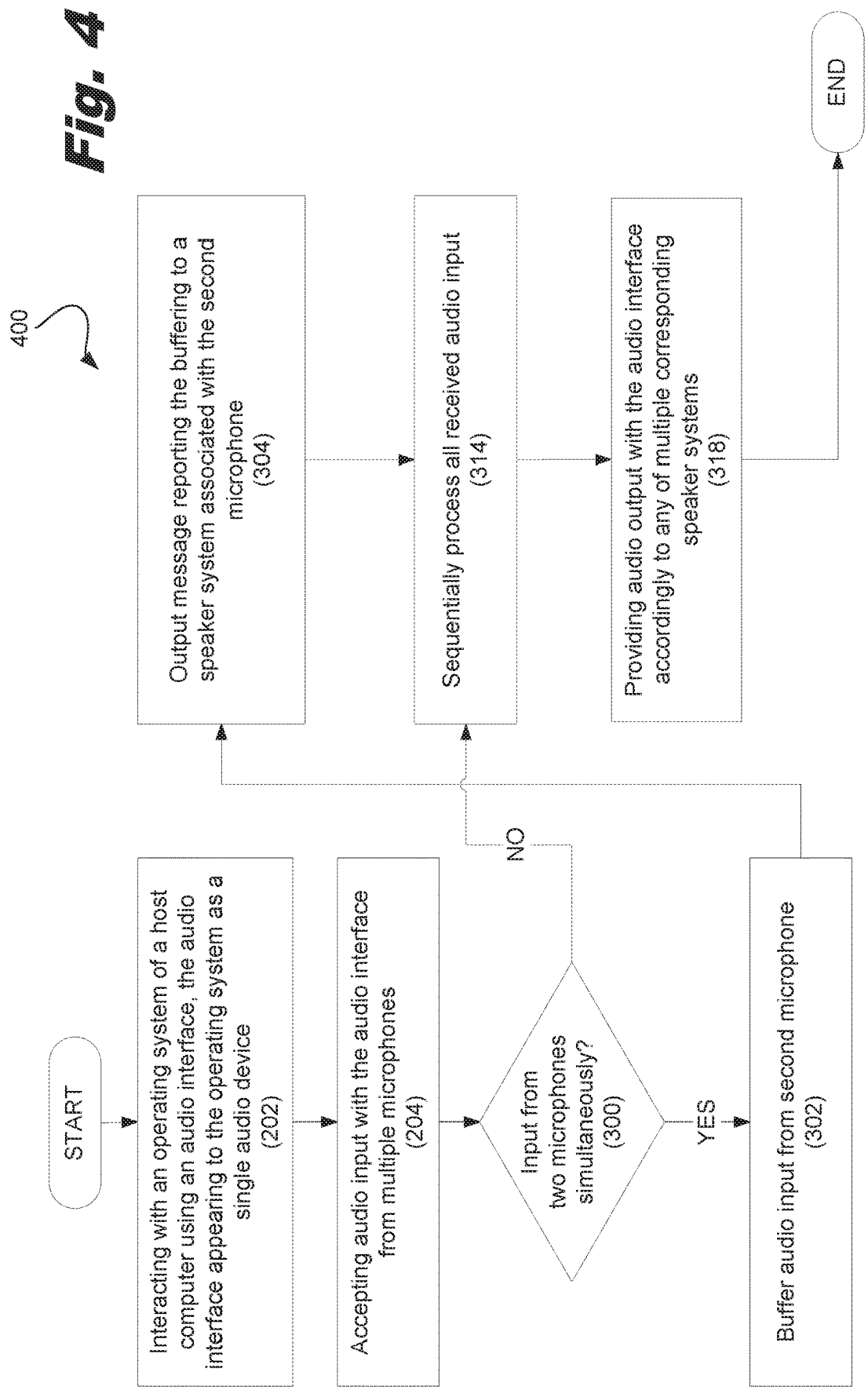
FIG. 4 is an example flowchart illustrating another method of interfacing multiple microphones or speaker systems with a host computer, including a buffer and queue, consistent with the disclosed implementations.

FIG. 4 is an example flowchart illustrating another method of interfacing multiple microphones or speaker systems with a host computer, including a buffer and queue, consistent with the disclosed implementations. The method of FIG. 4 is similar in some respects to that of FIG. 3.

As shown in FIG. 4, the method again includes interacting (202) with an operating system of a host computer using an audio interface, the audio interface appearing to the operating system as a single audio device. The method also includes accepting (204) audio input with the audio interface from multiple microphones.

When the audio interface receives audio input from two different microphones simultaneously, the audio interface will determine (300) that this is the case. If multiple inputs are not being received simultaneously, each microphone input is processed (314) sequentially, as received. If, however, two microphones input audio simultaneously, the method will buffer (302) the audio input from a second of the two microphones.

When this occurs, the audio interface will output an audio message reporting the buffering to a speaker system that is associated with the microphone whose input is being buffered. Thus, the speaker system associated with that microphone will verbally advise a user that the input from that microphone is being buffered. In this way, the user will know that an immediate response to the audio input may not be available due to the demands on the system. As before, the microphone in question may be associated with a particular speaker system because both are incorporated in the same portable transceiver unit with which a user is attempting to communicate with, for example, a personal assistant application.

The audio interface will sequentially process (314) all received audio input. In all cases, the host computer may return an audio output that is in response to a specific audio input. When this occurs, the method may include having the audio interface again determine a speaker system that corresponds to the microphone that provided the audio input to which the host is now responding. Accordingly, the audio interface provides (318) the audio output to the speaker system that corresponds to the microphone in question.

Figure 5:
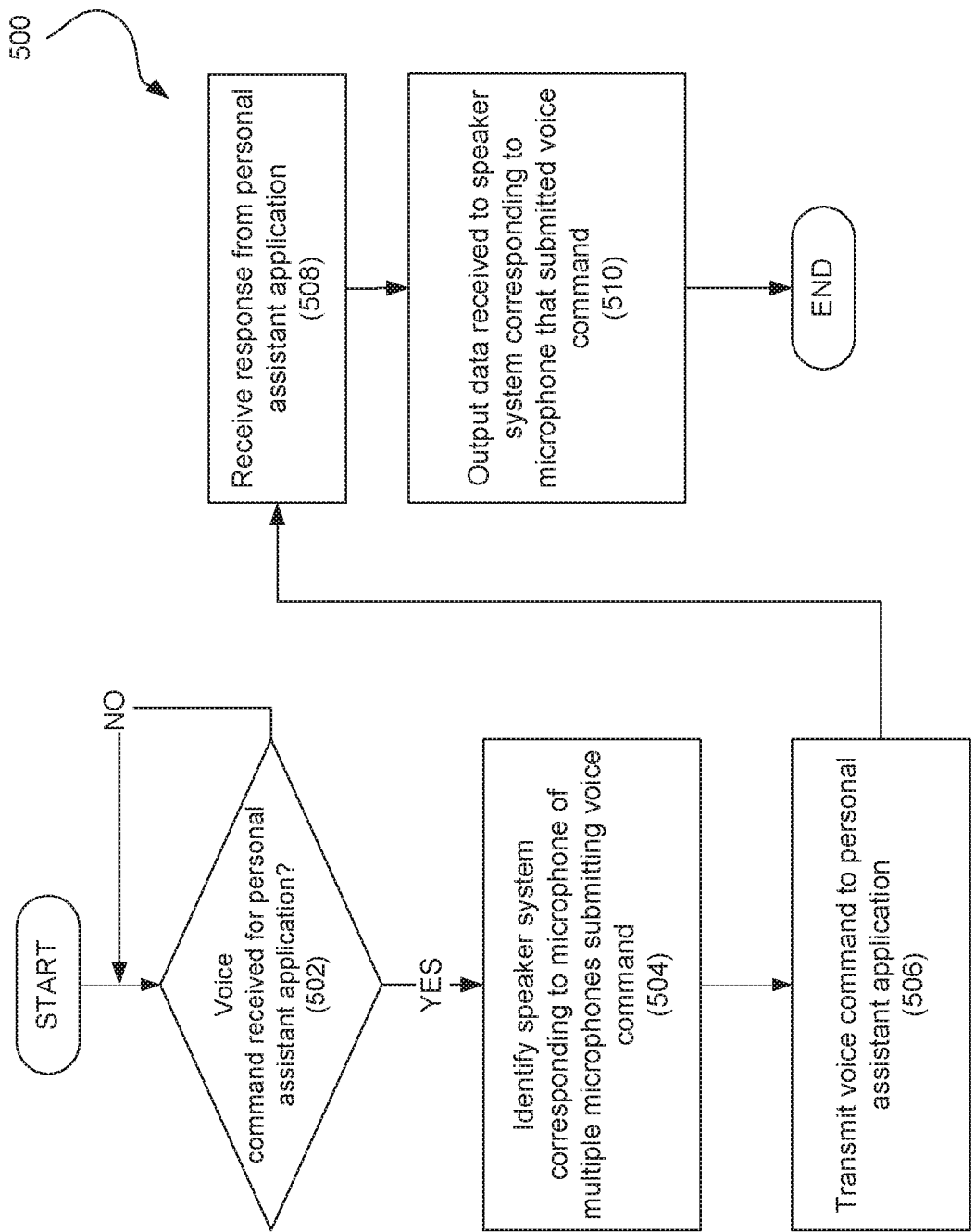
FIG. 5 is an example flowchart illustrating a method of using a personal assistant application using an audio interface consistent with the disclosed implementations.

FIG. 5 is an example flowchart illustrating a method of using a personal assistant application using an audio interface consistent with the disclosed implementations. As described above, the audio interface described herein may accept audio input for a host computer from a number of different microphones. This may be useful in a situation where a number of different portable transceiver units are deployed, any one of which a user may operate to submit a voice command to a personal assistant application remotely.

When the audio interface receives (502) a voice command for a personal assistant application from one of multiple microphones available, the audio interface will Identify (504) a speaker system corresponding to the microphone submitting voice command. The audio interface will then transmit (506) the voice command to the personal assistant application. When the response is received (508) to that voice command from the personal assistant application, the audio interface will then output (510) the data of the response to that speaker system identified as corresponding to the microphone that submitted the voice command.

Figure 6:
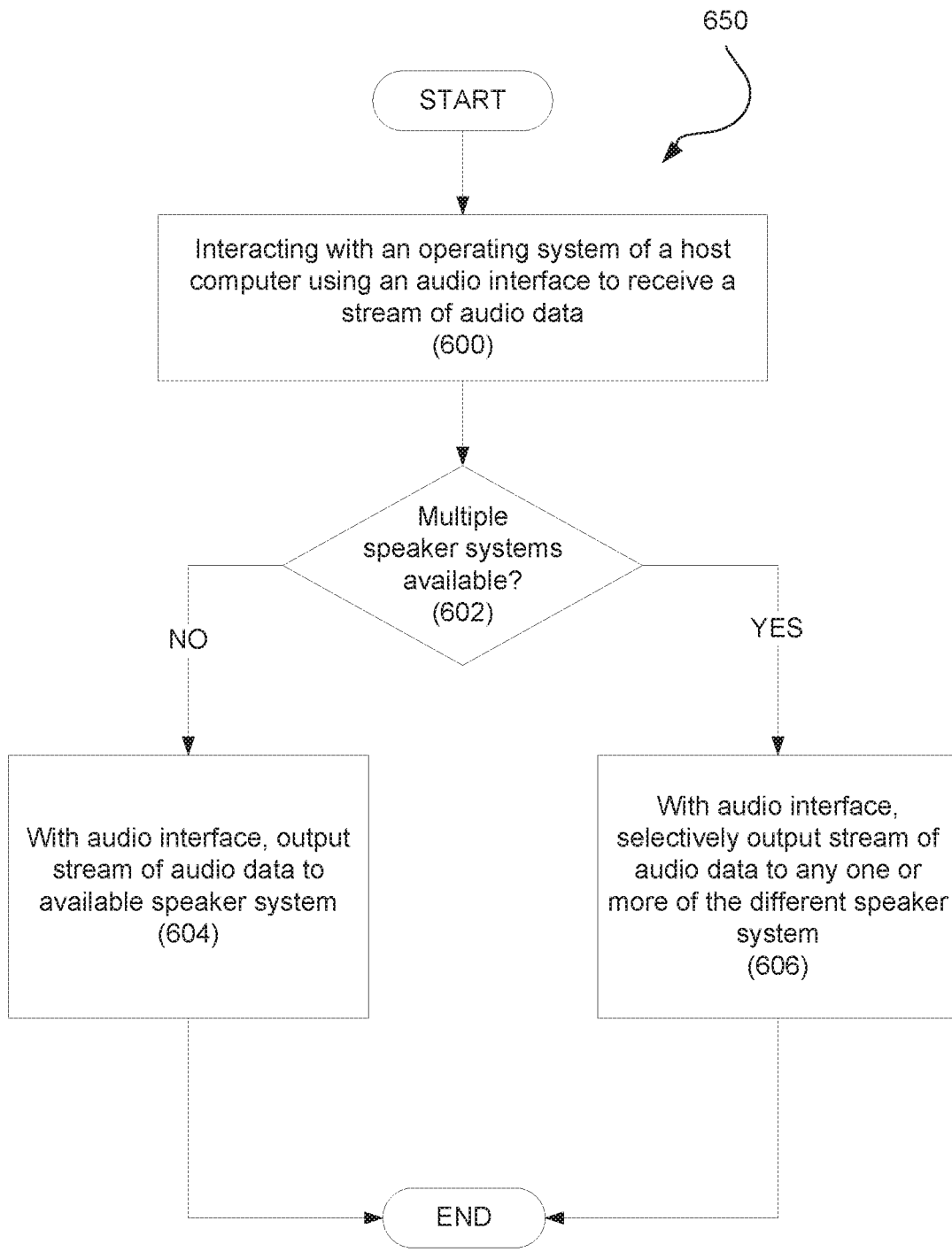
FIG. 6 is an example flowchart illustrating another method of interfacing multiple speaker systems with a host computer for audio streaming consistent with the disclosed implementations.

FIG. 6 is an example flowchart illustrating another method of interfacing multiple speaker systems with a host computer for audio streaming consistent with the disclosed implementations. As shown in FIG. 6, the method (650) includes interacting (600) with an operating system of a host computer using an audio interface to receive a stream of audio data. For example, this may be a stream of music that a user wants to hear either at the computer or remotely.

The audio interface next determines (602) whether there are multiple speaker systems available. If only a single speaker system is available, the audio interface outputs (604) the stream of audio data to that speaker system.

However, if there are multiples speaker systems available (602), the audio interface selectively outputs (606) the stream of audio data to any one or more of the different speaker systems. Any of the speaker systems may be in wired or wireless communication with the host computer.

Figure 7:
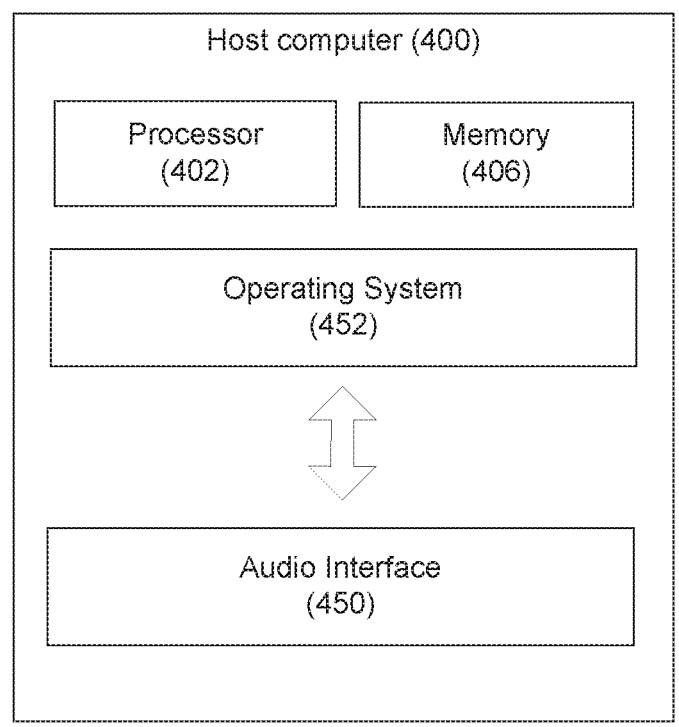
FIG. 7 is an illustration of an example host computer having an audio interface consistent with the disclosed implementations.

FIG. 7 is an illustration of an example host computer having an audio interface consistent with the disclosed implementations. As shown in FIG. 7, the host computer system includes: a processor (402); a memory device (406) to support operation of the processor; and an audio interface (450) to interface with an operating system (452) of the host computer (400) as a single audio device; accept audio input from multiple microphones; and provide an option to provide audio output to multiple speaker systems.

The memory (406) may include various memory devices, for example, Random Access Memory (RAM) and a mass data storage device such as a hard drive or solid state drive. The operating system (452) will be stored in the memory (406) when the host (400) is shut down and then instantiated when the host (400) is booted.

The audio interface (450), as described herein, compensates for the operating system (452) being configured to only interface with a single audio device of each type. The audio interface (450) will interface, as needed, with multiple microphones, speaker systems or headsets and coordinate the input from and output from all such devices for the operating system (452) as though the operating system (452) were handling only a single audio device of each type.

The audio interface (450) may include a user interface with which a user can select which microphone or microphones should be active and allowed to submit audio input to the operating system. Additionally, the user interface of the audio interface (450) may allow the user to select which of multiple available speaker systems should receive an audio output from the operating system (452). This selection could be for only one, a subset of all or all available speaker systems.

Figure 8:
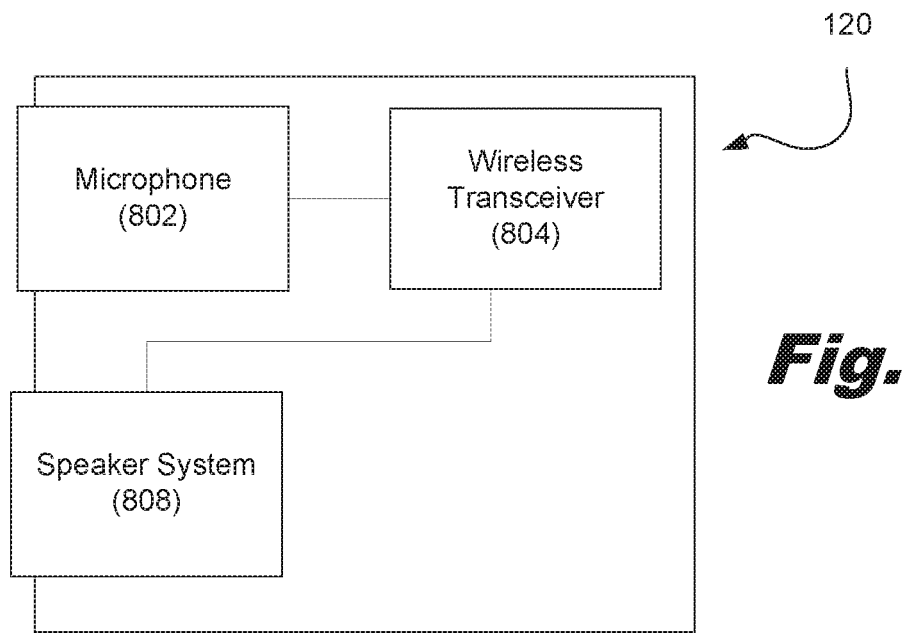
FIG. 8 is an illustration of an example portable transceiver unit for use with an audio interface consistent with the disclosed implementations.

FIG. 8 is an illustration of an example portable transceiver unit for use with an audio interface consistent with the disclosed implementations. As shown in FIG. 8, the portable transceiver unit (120) includes a microphone (802), a speaker system (808) and a wireless transceiver (804). The microphone (802) may be a single microphone or may be multiple microphones located at different locations on the portable transceiver unit (120). Multiple microphones on the portable transceiver unit (120) may provide better directional coverage.

With the microphone (802), the portable transceiver unit (120) can receive a voice command from a user. This voice command may be a voice command established for invoking a response on a host computer supporting the portable transceiver unit (120). More specifically, the voice command may be input for a personal assistant application executing on the supporting host computer.

The voice command, after being transduced by the microphone (802), is provided to the wireless transceiver (804). The wireless transceiver (804) wirelessly transmits the data of the voice command to the supporting host computer.

If the command is addressed to a personal assistant application, the host computer will process the command with the personal assistant application. A word or phrase stated at the beginning of the command can designate the command or inquiry as being intended for a particular personal assistant application.

In some examples, the portable transceiver unit (120) may be used to send a command to launch the personal assistant application that is not presently available. The personal assistant application could be launched in response to a voice command made by the user at the portable transceiver unit (120) and transmitted to the host computer.

Figure 9:
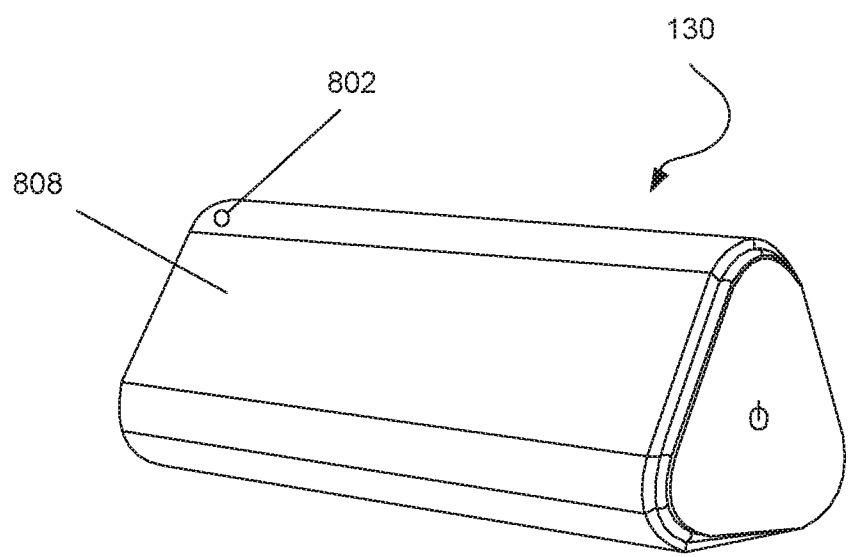
FIG. 9 is another illustration of an example portable transceiver unit for use with an audio interface consistent with the disclosed implementations.

FIG. 9 is another illustration of an example portable transceiver unit for use with an audio interface consistent with the disclosed implementations. As shown in FIG. 9, the speaker (808) may be a high fidelity speaker and occupy the majority of the bulk of the portable transceiver unit (120). Consequently, the portable transceiver unit (120) can be used additionally or primarily as a portable speaker unit to stream audio from the host computer. Though not shown in this figure, this unit (130) will include internally the wireless transceiver as described above in connection with FIG. 8.

Figure 10:
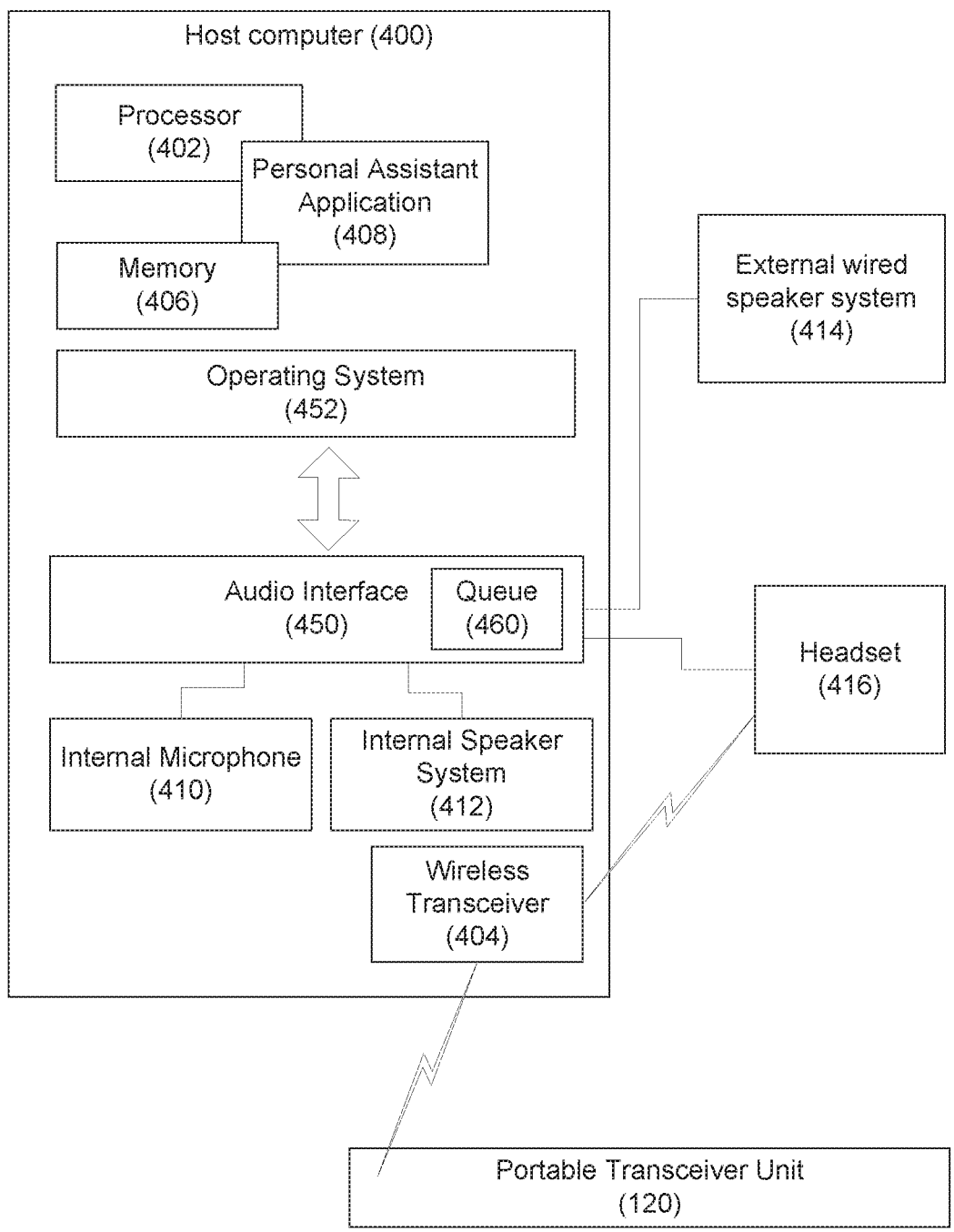
FIG. 10 is an illustration of an example system having a host computer with audio interface and a portable transceiver unit consistent with the disclosed implementations.

FIG. 10 is an illustration of an example system having a host computer with audio interface and a portable transceiver unit consistent with the disclosed implementations. As shown in FIG. 10, a host computer (400) includes a processor (402), memory (406) and operating system (452). In some examples, as described above, the computer (400) may include a personal assistant application (408).

The host computer (400) also includes an audio interface (450) as described herein. The audio interface (450), as described herein, compensates for the operating system (452) being configured to only interface with a single audio device of each type. The audio interface (450) will interface, as needed, with multiple microphones, speaker systems or headsets and coordinate the input from and output from all such devices for the operating system (452) as though the operating system (452) were handling only a single audio device of each type.

In the illustrated example, the audio interface (450) may be interfaced with all of an internal microphone (410), internal speaker system (412), an external wired speaker system (414), a wired or wireless headset (416) and a wireless speaker or portable transceiver unit (120) as described herein. The audio interface (450) allows the host computer (400) to operate and make use of any and all of these devices despite the limitations on the operating system (452). To accommodate these various audio devices, the audio interface may include a queue (460), as described above.

The host computer (400) also includes a wireless transceiver (404) as described herein. This wireless transceiver (404) provides communication with any wireless audio devices, for example, a wireless headset (416) or portable transceiver unit (120). The wireless audio devices may communicate using any wireless protocol, for example, Bluetooth or a wireless local area network (WiFi).

The preceding description has been presented only to illustrate and describe examples of the principles described. This description is not intended to be exhaustive or to limit these principles to any precise form disclosed. Many modifications and variations are possible in light of the above teaching.

What is claimed is:

1. A non-transitory computer-readable medium comprising instructions that, when executed by a processor, provide an audio interface:
the audio interface to communicate with an operating system of a host computer, the operating system to only interface with a single microphone at a time, the audio interface communicating with the operating system as a single audio device;
the audio interface to accept audio input from multiple microphones to be processed by the operating system, the audio input from the multiple microphones being accepted simultaneously; and
the audio interface to provide an option to provide audio output to multiple speaker systems.

2. The computer-readable medium of claim 1, wherein the audio interface communicates with the microphones and a number of speaker systems using both wired and wireless protocols.

3. The computer-readable medium of claim 1, further comprising instructions that, when executed by a processor, buffer audio input received from a second microphone during a time when audio input from a first microphone is being input to the operating system of the host computer.

4. The computer-readable medium of claim 3, further comprising instructions that, when executed by a processor, provide a first-in, first-out queue for audio input received from the multiple microphones, the audio interface sequentially providing the audio input from the queue to the operating system as though all audio input were received by a single microphone represented by the audio interface.

5. The computer-readable medium of claim 3, further comprising instructions that, when audio input from the second microphone is being buffered, the instructions, when executed by a processor, transmit an audio message to a speaker system associated with the second microphone reporting the buffering.

6. The computer-readable medium of claim 1, wherein the audio input comprises a voice command to a personal assistant application executing on the host computer, and the instructions, when executed by a processor:
receive a response to the voice command from the personal assistant application, the response comprising an audio message; and
output the audio message to a speaker system incorporated in a common portable unit with a microphone from which the voice command was input, each of the multiple microphones being incorporated in a different portable unit with a respective one of the multiple speaker systems.

7. The computer-readable medium of claim 6, wherein the audio message is output only to the speaker system corresponding to the microphone from which the voice command was input.

8. The computer-readable medium of claim 1, further comprising instructions that, when executed by a processor, selectively output an audio stream from the host computer to multiple speaker systems simultaneously.

9. The computer-readable medium of claim 1, wherein the operating system is also configured to operate with only a single speaker, the audio interface selectively distributing audio output from the operating system to different speaker systems of the multiple speaker systems.

10. The computer-readable medium of claim 1, wherein each microphone of the multiple microphones is incorporated into a separate portable unit with one of the speaker systems of the multiple speaker systems.

11. The computer-readable medium of claim 1, wherein the audio input comprises a command to which the operating system outputs an audio signal in response, the audio interface routing the audio signal responding to the command to a speaker system in a same portable unit as a microphone that provided the audio input comprising the command.

12. A method comprising:
interacting with an operating system of a host computer using an audio interface, the operating system to interface with only one audio device at a time, the audio interface appearing to the operating system as a single audio device;
accepting audio input with the audio interface from multiple microphones simultaneously, where the multiple microphones are in different locations and are transducing different user's voices, the audio input from the multiple microphones being presented to the operating system through the audio interface sequentially as though from a single microphone; and
providing an option with the audio interface to output audio selectively to multiple speaker systems.

13. The method of claim 12, further comprising buffering audio input received from a second microphone during a time when audio input from a first microphone is being input to the operating system of the host computer.

14. The method of claim 12, further comprising:
with the audio interface, receiving a voice command to a personal assistant application executing on the host computer, the voice command being input to one of the multiple microphones supported by the audio interface;
with the audio interface, providing the voice command to the personal assistant application;
with the audio interface, receiving a response to the voice command from the personal assistant application, the response comprising an audio message; and
with the audio interface, outputting the audio message to a speaker system corresponding to the microphone from which the voice command was input.

15. The method of claim 12, wherein:
each microphone of the multiple microphones is incorporated into a separate portable unit with one of the speaker systems of the multiple speaker systems; and
the audio input comprises a command to which the operating system outputs an audio signal in response, the audio interface routing the audio signal responding to the command to a speaker system in a same portable unit as a microphone that provided the audio input comprising the command.

16. The method of claim 15, wherein the command is a command to a personal assistant application executing on the operating system of the host computer.

17. A host computer system comprising:
a processor;
a memory device to support operation of the processor;

an operating system to operate with only a single microphone at a time; and an audio interface to:
- interface with the operating system of a host computer as a single audio device;
- accept audio input from multiple microphones that are transducing sound from different sources at different locations, such that the audio input from the multiple microphones can be processed by the operating system as if from a single microphone; and
- provide an option to output audio selectively to multiple speaker systems.

18. The host computer system of claim 17, further comprising a portable transceiver unit comprising a speaker system, microphone and wireless transceiver, the portable transceiver unit to communicate with the audio interface in addition to a microphone and speaker system incorporated into the host computer.

19. The host computer system of claim 18, the wireless transceiver of the portable transceiver unit to:
- receive a voice command for a personal assistant application of the host computer through the microphone of the portable transceiver unit;
- recognize the voice command; and
- transmit the voice command to a corresponding wireless transceiver incorporated with the host computer.

20. The host computer system of claim 17, further comprising a first-in, first-out queue for audio input received from the multiple microphones, the audio interface sequentially providing audio input from the queue to the operating system as though all audio input were received by the single microphone represented by the audio interface.

* * * * *